United States Patent [19]
Choate

[11] Patent Number: 6,161,264
[45] Date of Patent: Dec. 19, 2000

[54] SAFETY HOOK

[75] Inventor: Gary E. Choate, Denver, Colo.

[73] Assignee: Soll USA, LLC, Franklin, Pa.

[21] Appl. No.: 09/185,675

[22] Filed: Nov. 4, 1998

[51] Int. Cl.[7] ..................................... F16B 45/02
[52] U.S. Cl. ........................................ 24/599.5; 24/600.1
[58] Field of Search ............................... 24/599.5, 599.9, 24/600.1, 600.2; 294/82.2

[56] References Cited

U.S. PATENT DOCUMENTS

| | | |
|---|---|---|
| 1,622,971 | 3/1927 | Porter . |
| 1,949,608 | 3/1934 | Johnson . |
| 2,197,997 | 4/1940 | Dee . |
| 2,490,931 | 12/1949 | Thompson . |
| 2,514,656 | 7/1950 | Manson . |
| 2,657,446 | 11/1953 | Roberts . |
| 3,317,972 | 5/1967 | Harley . |
| 3,949,451 | 4/1976 | Bunn . |
| 4,062,092 | 12/1977 | Tamada et al. . |
| 4,122,585 | 10/1978 | Sharp et al. . |
| 4,179,148 | 12/1979 | Johnson . |
| 4,434,536 | 3/1984 | Schmidt et al. . |
| 4,528,728 | 7/1985 | Schmidt et al. . |
| 4,528,729 | 7/1985 | Schmidt et al. . |
| 4,546,523 | 10/1985 | Bailey, Jr. . |
| 4,908,913 | 3/1990 | Moi . |
| 4,977,647 | 12/1990 | Casebolt . |
| 5,257,441 | 11/1993 | Barlow . |
| 5,579,564 | 12/1996 | Rullo et al. . |
| 5,735,025 | 4/1998 | Bailey . |

OTHER PUBLICATIONS

P. 5 of Rose Manufacturing Catalog. Published More Than One Year Prior To Filing Of This Application (Publication Date Unknown).

*Primary Examiner*—James R. Brittain
*Attorney, Agent, or Firm*—Ramon L. Pizarro

[57] ABSTRACT

A safety hook that includes a hook portion having a hook body with a shank portion, a nose portion and a mouth between the shank and the nose portion, a gate having a closure and at least one web portion along a plane is mounted on the hook body. The web portion of the gate includes a protrusion that extends away from the plane of the web portion and towards the mouth of the hook. A locking element with at least one wall portion that has a slot adapted for receiving the protrusion of the gate is mounted against the shank of the hook body. The wall portion will preferably be mounted between the web and the shank of the hook so that the locking element is movable from a first position, where the wall portion impedes motion of the protrusion on the web portion of the gate, and a second position where the slot receives the protrusion on the web portion, allowing opening of the gate, so that the gate can move to provide access to the mouth of the hook.

13 Claims, 2 Drawing Sheets

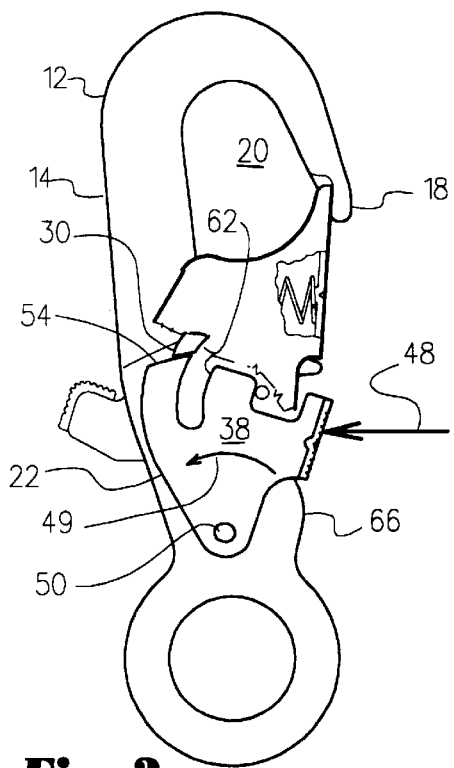
Fig. 3
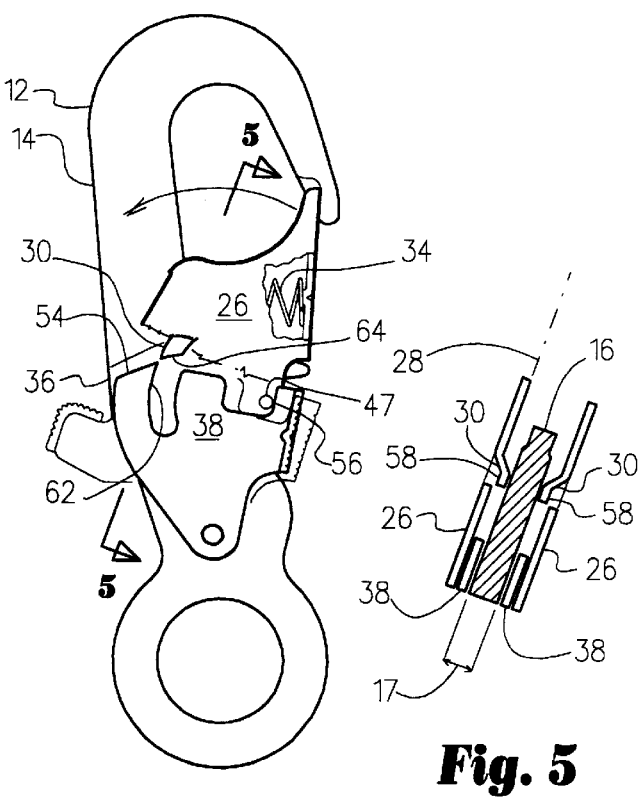
Fig. 4     Fig. 5
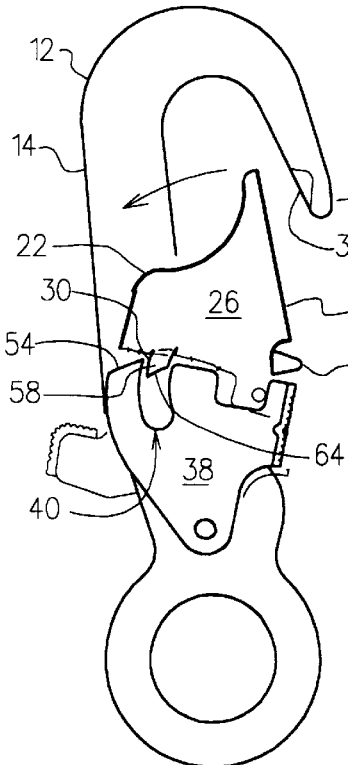
Fig. 6
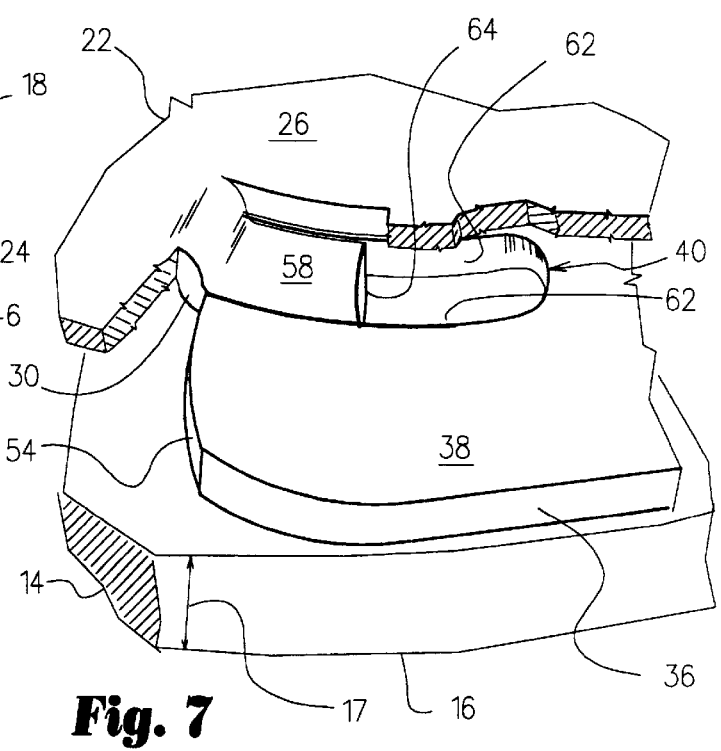
Fig. 7

SAFETY HOOK

BACKGROUND OF THE INVENTION (a) Field of the Invention

This invention generally relates to a double action, single lock snap hook. More particularly, but not by way of limitation, to a locking mechanism for a double action, self locking snap hook.

(b) Discussion of Known Art

The field of safety hooks which are used in fall prevention equipment presents several important problems which have yet to be solved by known devices. Safety hooks typically include a spring loaded gate which is used to close off the mouth of the hook in order to prevent the release or disengagement of rings, lines, or other accessories held in the mouth of the hook. The prevention of the unintended opening of the gate has been an important problem which has been addressed by a variety of mechanisms. Most mechanisms which are directed at preventing the unintended opening of the gate include a latch mechanism which prevents motion of the gate.

It is important that the latch mechanism not complicate the overall mechanism of the safety hook. It is known through experience that complicated mechanisms provide more opportunity for failure by way of failure of individual components, and particularly by way of failure due to damage of individual components while in use. Many known designs for closure mechanisms include complements that protrude from the profile of the hook mechanism, and thus are prone to mechanical damage from use in the field. Additionally, the exposure of the lock components provides easy access to these components, so that they may be modified, overridden, or even eliminated in the field by the user.

Additionally, it is desirable to provide a double action, self locking safety hook mechanism which can be activated by the user with a single hand. It is particularly desirable to provide a mechanism that can be activated by providing opposing forces by gripping the hook between the thumb and the index finger of the hand.

A review of known devices reveals that there remains a need for a safety hook closure mechanism which conceals important components to prevent damage in the field or modification by the user.

There remains a need for a safety hook closure mechanism which can be activated with a single hand, and which conceals or maintains important component during operation.

Still further, there remains a need for a safety hook which can be made from few parts, and particularly few parts requiring special forgings or castings. More specifically, there remains a need for a safety hook mechanism that uses stamped sheet metal components, and which uses the sheet metal components in a manner which avoids or minimizes the possibility of seizure of moving parts due to damage from use in the field.

There remains a need for a reliable closure mechanism which minimizes the effects of manufacturing tolerances on the function and reliability of the mechanism.

SUMMARY

It has been discovered that the problems left unanswered by known art can be solved by providing a snap hook with a locking mechanism which includes:

- a gate movably mounted on the hook body, the gate having a closure portion and at least one web portion, the web portion including a protrusion that extends away from web portion; and
- a locking element that is moveably mounted against the body of the hook, the locking element having a wall portion having a slot, the locking element being movable from a first position where the wall portion impedes motion of the protrusion on the web portion of the gate, and a second position where the slot receives the protrusion on the web portion, so that the gate can move to open access to the mouth of the hook.

In a preferred embodiment of the invention the gate includes a pair of webs joined closure portion. Each of the web portions includes the protrusion, which, in a preferred embodiment, include a generally flat section that is generally parallel with the webs. These flat sections cooperate with the slot in the locking element. Therefore, in a highly preferred embodiment of the invention the locking element includes a pair of walls, each of the walls being adapted for nesting between the webs of the gate and the body of the hook. This arrangement allows the slot in each of the walls to cooperate with the body of the hook and the webs of the gate to form a concealed track or chamber which can accept the protrusions of the webs to allow the gate, together with the webs, to move and provide access to the mouth of the gate.

It has been discovered that the disclosed arrangement conceals important components of that allow the gate to lock, closing off the mouth of hook. The concealment of these components discourages modification of the lock mechanism components by users in the field. Additionally, the concealment of the important components greatly reduces the possibility of damage to the mechanism due to improper handling and care. Still further, the concealment reduces the possibility of fouling and malfunction of the mechanism due to the introduction of foreign materials, such as dirt.

Additionally, it has been found that important new and useful synergistic results can be achieved with the disclosed invention. For example, it is preferred that the gate and the locking element be made of sheet metal of approximately the same thickness. With the disclosed structure it has been discovered that the nesting of the walls of the locking element between the webs of the gate takes advantage of the similar thicknesses of the different parts to create well fitting parts establish reliable cooperation of the protrusion and slot, for example.

It has been discovered that the disclosed structure also produces a reliable mechanism which is difficult to accidentally actuate.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 illustrates the use of the disclosed safety snap hook with a single hand.

FIG. 2 an exploded view of the components of the safety snap hook.

FIG. 3 is a side view of a highly preferred embodiment of the invention, the invention shown with a portion of the gate web broken away to reveal the engagement of the protrusion on the web of the gate with the wall of the locking element to prevent as rotation or opening of the gate.

FIG. 4 is a side view similar to FIG. 3 and illustrating the positioning of the slot of the wall of the locking element so that the slot can accept the protrusion on the web of the gate.

FIG. 5 a sectional view of taken at the location indicated on FIG. 4 and looking in the direction of the arrows indicating the location of the section. The view illustrating the cooperation of the slot and the protrusions of a highly preferred embodiment of the invention.

FIG. 6 is a side view with a portion of the gate broken away to reveal the cooperation of a protrusion on the web and a slot on the locking element.

FIG. 7 is a perspective view of the slot and cooperation of the flat area of the protrusion on the webs and the slot in the walls, the view illustrating one side of the hook with portions of the web, walls and hook broken away.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
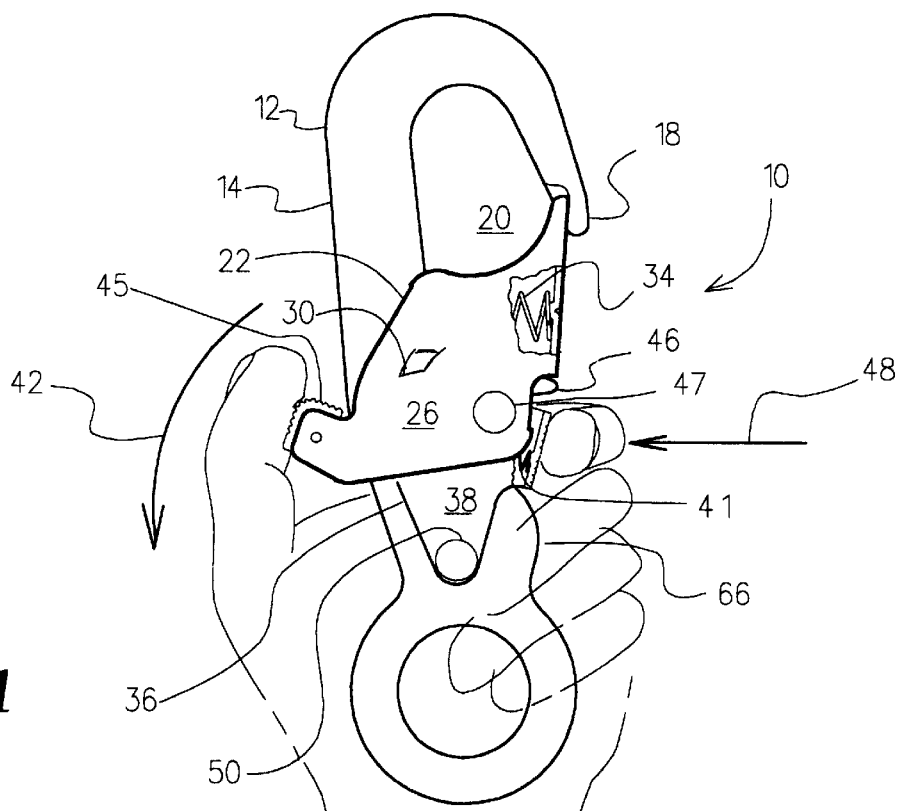
Figure 2:
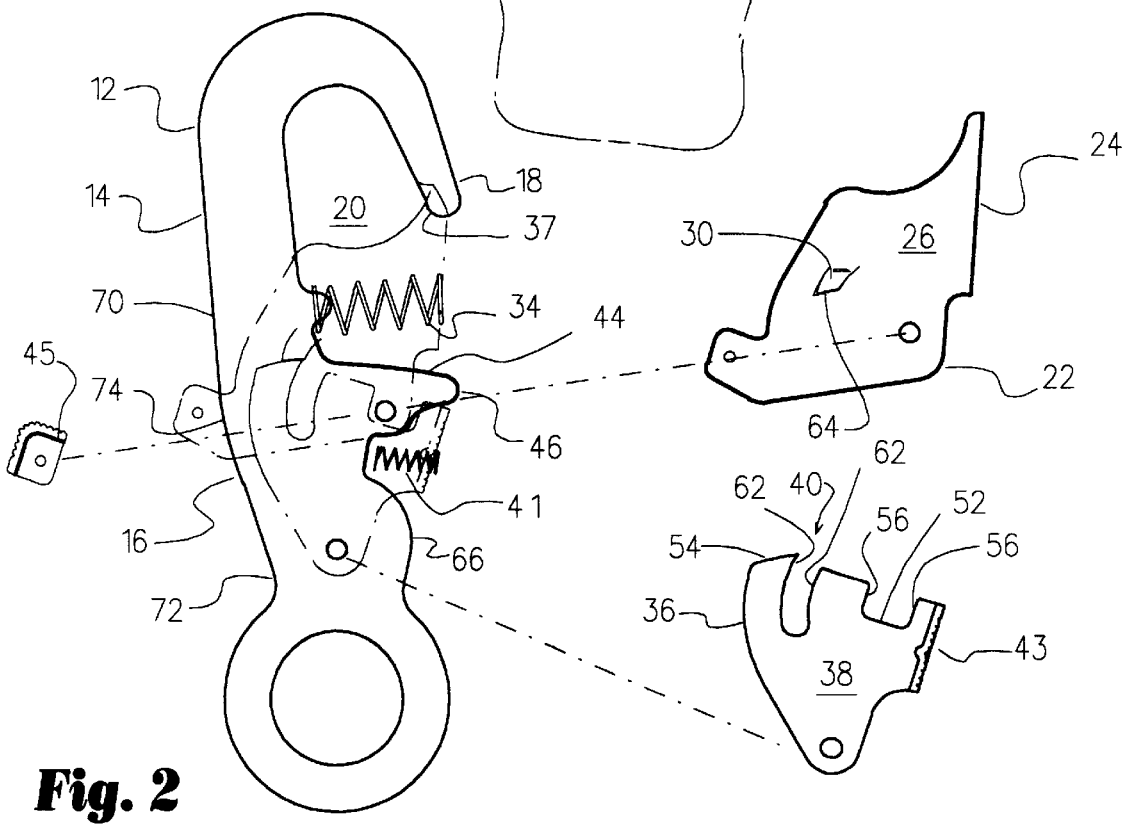

Turning now to FIG. 1 where a safety hook 10 incorporating novel features taught herein has been illustrated. The safety hook 10 includes a hook portion 12 which consists of a hook body 14, having a shank portion 16 of a thickness 17. Additionally, the hook body 14 will include a nose portion 18 and a mouth 20 that is located between the shank 16 and the nose portion 18. In FIG. 2 it has been illustrated that the shank 16 will include a first end 70 near the nose portion 18, a second end 72, and a mid-portion 74 between the second end 72 and the first end 70 of the shank 16.

Access to and from the mouth 20 of the hook 10 is controlled by a gate 22 which is mounted on the hook body 14. In a preferred embodiment of the gate 22, the gate 22 includes a closure portion 24 which will cooperate with the nose portion 18 to closed off access to the mouth 20. The gate 22 will preferably include at least one web portion 26 along a plane 28. The web portion 26 includes a protrusion 30 that extends away from the plane 28 of the web portion 26 and towards the body 14 of the hook 12.

In a highly preferred embodiment of the invention the gate 22 will cooperate with a locking element 36 which will prevent excessive movement of the gate 22 to prevent undesired opening of the hook mouth 20. In a highly preferred embodiment of the invention, the gate 22 will include a pair of web portions 26 spaced apart from one another at a distance 32 that is slightly larger than the thickness 17 of the shank 16 of the hook body 14, and large enough to permit proper nesting of the locking element 36 between the webs 26 and the shank 16, as will be described in greater detail below. With this arrangement the spaced apart web portions 26 can straddle the shank 16 of the hook 12 and the locking element 36, allow pining of the web portions of the gate 22 over the shank 16 of the hook 12 and the locking element 36. Importantly, the pinned attachment of the web or webs 26 allows the gate 22 to pivot between a closed position, illustrated in FIG. 1, and an open position, illustrated in FIG. 6, when freed from the locking element 36.

Referring to FIGS. 1 and 2, it will be understood that to urge the gate 22 to the closed position a gate spring 34 is mounted between the shank 16 and the closure 24 of the gate 22. The gate spring 34 will force the closure 24 against the nose 18 of the hook 12. Additionally, the nose 18 will preferably include a ridge 37 which will extend into a recess (not shown) in the closure 24 to minimize the possibility of an aperture created by the separation of the closure 24 from the nose 18 due to wear or abuse.

Referring now to FIGS. 3–6, where the function of the locking feature of the disclosed invention has been illustrated in sequence. These figures illustrate that the locking element 36 will include at least one wall portion 38 that includes a slot 40 that has been adapted for receiving the protrusion 30 of the web 26, or each of the webs, of the gate 22. The wall portion 38 of the locking element 36 will be generally parallel to plane 28, and extend between the web 26 and the shank 16 of the hook body 14. Additionally, the locking element 36 will be supported against the shank 16 such that the wall portion 38 is movable from a first position, illustrated in FIG. 3, where the wall portion 38 impedes motion of the protrusion 30 on the web portion 26 of the gate 22, and a second position, illustrated in FIGS. 4–7, and particularly in FIG. 5, where the slot 40 can accept the protrusion 30 on the web portion 26. Thus, movement of the locking element 36 from the first position to the second position frees the gate 22, allowing the gate 22 to be moved to open the mouth 20 as shown on FIG. 6. Since the gate 22 is biased to a closed position by the gate spring 34, movement of the gate 22 would be in response to a force against the closure 24 of the gate 22 that would overcome the bias of the gate spring 34 and rotate the gate in the direction of arrow 42. In a preferred embodiment a thumb grip 45 is used to rotate the gate 22.

It is preferred that the locking element 36 will be biased in its first position by a spring 41. The spring 41 mounts between the shank 16 and a gate lock trigger 43 which will preferably extend across and join a pair of walls 38.

In operation, it is contemplated that movement of the gate 22 as well as the movement of the locking element 36 will be accomplished through the pinned connections of these elements against the hook 12. It is contemplated that other means for attaching and allowing movement of the gate 22 or the locking element 36 may be employed without departing from the inventive concepts taught herein. For example, it is contemplated that the gate 22 or locking elements may be mounted on tracks or slots. However, the simplicity and manufacturability of the pinned connection is preferred. Thus, in a highly preferred embodiment of the invention the shank 16 includes a peninsular portion 44, which serves in part as a gate guard, and which extends from the shank 16 and terminates in a tip 46 that will extend beyond the gate 22, and most preferably beyond the closure 24 of the gate 22. The gate 22 will be attached by gate pin 47 to the peninsular portion 44, near the tip 46 of the peninsular portion 44.

As shown in FIGS. 1–6, it is preferred that the locking element be pivotally attached to the hook body 14 at a location near the lower end the shank 16 of the hook 12 by pin 50. Since it is contemplated that the invention will be operated with a single hand, it its important that the actuation points for operating the gate 22 as well as the locking element 36 balance the need to actuate the hook manually and the need to maintain the hook in a locked configuration. As discussed above, to open the gate 22, the user will first press the trigger 43 of the gate locking element 36 with the index finger in the direction of arrow 48. Once the bias of the spring 41 is overcome, the locking element 36 will pivot about pin 50 until the slot 40 can accept the protrusion 30. By increasing the distance between the pin 50 and the location of the spring 41, one increases the mechanical advantage of the lock mechanism to keep the locking element 36 in a secure, locked, position. Towards this end, it is preferred that the pin 50 be positioned at the lower extreme of the shank 16, where the distance between the position on the trigger 43 which accepts the bias of the spring 41 and the pin 50 is approximately the same or greater than the distance between the pin 50 and the contact surface 54 of the locking element 36. The contact surface 54 is the surface on the locking element 36 which reacts or contacts the protrusion 30 of the gate 22 to prevent opening of the gate 22.

It is also important to note that in a highly preferred embodiment of the invention the locking element 36 will include a limiting recess 52 which will cooperate with the gate pin 47 to limit the travel of the locking element 36. The gate pin 47 will be nested in the limiting recess 52, so that the motion of the locking element 36 between the first position, where the motion of the gate is prevented, and the second position, where the protrusion 30 of the gate can be accepted by the slot 40, will be limited by the interaction of the ends 56 of the limiting recess 52 and the gate pin 47.

Referring to FIGS. 5 and 7, it will be understood that the protrusion 30 will preferably include a flat portion 58 which is substantially parallel to the plane 28. Additionally, the flat portion 58 will be immediately next to the web 26. This arrangement will allow the web 26 to conceal and enclose the slot 40 between the shank 16 and the web 26. Therefore the slot 40, together with the shank 16 and the web 26 cooperate to form a passage way 60 for the flat portion 58 of the protrusion 30. It has been discovered that by forming a passage way 60 that is closely bounded by the shank 16, the edges 62 of the slot 40 and the web 26, one can achieve concealment of the locking mechanism to prevent damage to the locking mechanism during use in the field. Additionally, by forming the gate 22 and the locking element 36 from stamped sheet metal of approximately the same thickness, one can produce a precisely cooperating set of components.

Still further, a close examination of the protrusion 30 will reveal that it includes an angled or arched leading end 64. The arched or angled configuration of the leading end helps to distribute bearing loads transmitted from the leading end 64 of the protrusion 30 on to the contact surface 54 of the locking element 36. Reducing the contact stresses on the area of contact between these two components results in reduces wear of the two components as well as smoother, effortless action of the mechanism as the two components slide past one another. Accordingly, to minimize the bearing loads along the contact surface it is contemplated that the leading end 64 of the protrusion 30 will have an arched configuration and the contact surface 54 will have a matching arched configuration, centered about the pin 50 of the locking element 36.

It is also important to note that it is preferred that the leading end 64 of the protrusion 30 be formed by upsetting or deflecting the protrusion from the plane 28 of the web 26 a distance that is approximately equal to the thickness of the web 26. This configuration will produce a leading end 64 that is likely to bear against the contact surface 54 squarely with minimum possibility of binding against the wall portion 38.

Referring once again to FIG. 1, it is also contemplated that the peninsular portion 44 will play an important role in resisting the unwanted opening of the gate 22. As illustrated in FIG. 1, the tip 46 of the peninsular portion 44 will project from between the gate 22 and the trigger 43 of the locking element 36. It has been discovered that since a force in the direction of arrow 48 is needed to release the gate 22. By placing the tip 46 between the closure 24 of the gate 22 the trigger 43 one reduces the possibility of having a single object press on both the trigger 43 and the gate 22 at the same time in the direction of arrow 48. Additionally, it is contemplated that a proud portion 66 will be incorporated on the lower portion of the shank 16. Thus as illustrated, the trigger 43 will be nestled and protected by the projection of the tip 46 at one end and the projection of the proud portion 66 of the lower end of the shank 16.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. Safety hook comprising:

a hook portion having a hook body having a shank portion, a nose portion and a mouth between the shank and the nose portion;

a gate pivotally mounted on the shank portion of the hook body, the gate having a closure portion and at least one web portion along a plane, the web portion including a protrusion that extends away from the plane of the web portion and towards the body of the hook; and a locking element having at least one wall portion having a slot adapted for receiving the protrusion of said gate, the wall portion being pivotally mounted against the shank portion of the hook body with the web portion of said gate being mounted over the wall portion of the locking element, and so that said locking element is moveable from a first position where the wall portion impedes motion of the protrusion on the web portion of the gate, and a second position where the slot receives the protrusion on the web portion, so that the gate can move to open access to the mouth of the hook; and a peninsular portion extending from said shank of said hook towards the nose of said hook, said peninsular portion terminating in a tip that protrudes between said gate and said locking element, that an actuation movement of the locking element is segregated from the gate.

2. A safety hook according to claim 1 wherein said gate further comprises a pair of web portions, each web portion being along a plane and spaced apart from one another, each web portion having opposing protrusions extending towards one another and away from each of the planes of the webs.

3. A safety hook according to claim 2 wherein said locking element comprises a pair of wall portions, each wall portion being along a plane and spaced apart form one another at a distance that allows the wall portions to nest between said web portions of said gate and accept the shank of the body of said hook, each wall portion having a slot adapted for receiving the protrusions of the webs of the gate.

4. Safety hook comprising:

a hook portion having a hook body having a shank portion, a nose portion and a mouth between the shank and the nose portion, the shank portion further having a first end near the nose portion, a second end, and a mid portion between second end and the first end, the first end being between the mid-portion and the nose portion;

a gate, the gate having a closure portion and at least one web portion along a plane, the web portion being pivotally mounted against the shank portion of the hook body and including a protrusion that extends away from the plane of the web portion;

a locking element having a planar wall portion having a slot and a trigger portion extending from the wall portion at an angle to the wall portion, the wall portion being pivotally mounted against the shank portion in a parallel fashion next to the web portion of the gate, the locking element being moveable from a first position where the wall portion impedes motion of the protrusion on the web portion of the gate to a second position where the slot receives the protrusion on the web portion allowing the gate to move to open access to the mouth of the hook; and a peninsular portion extending from said shank of said hook towards the nose of said hook, said peninsular portion terminating in a tip that protrudes between said gate and said trigger portion, so that movements of the trigger portion are segregated from the gate by the peninsular portion.

5. A safety hook according to claim 4 wherein said gate further comprises a pair of web portions, each web portion being along a plane and spaced apart from one another, each web portion having opposing protrusions extending towards one another and away from each of the planes of the webs.

6. A safety hook according to claim 5 wherein said locking element comprises a pair of wall portions, each wall portion being along a plane and spaced apart form one another at a distance that allows the wall portions to nest between said web portions of said gate.

7. A safety hook according to claim 4 wherein the wall portion of the locking element is mounted next to the shank of said hook and the web portion of said gate is mounted over the wall portion of the locking element, so that the wall portion of the locking element is substantially concealed by the web portion of said gate.

8. Safety hook comprising:

a hook portion having a hook body having a shank portion, a nose portion and a mouth between the shank and the nose portion;

a gate, the gate being pivotally mounted on the shank portion of the hook and having a closure portion between a pair of opposing web portions, each of the web portions including a protrusion that extends away from the web portions and towards the opposing web portion; and a locking element having a pair of planar wall portions having a slot and a trigger portion extending between the wall portion adapted for accepting a force, the wall portions being mounted next to, and on opposite sides of, the shank body, the locking element being movable from a first position where the wall portion impedes motion of at least one of the protrusion on the web portion of the gate, and a second position where the slots receives the protrusions on the web portion, so that the gate can move to open access to the mouth of the hook; and a peninsular portion extending from said shank of said hook towards the nose of said hook, said peninsular portion terminating in a tip that protrudes between said gate and said trigger portion.

9. A safety hook according to claim 8 wherein said gate further comprises a pair of web portions, each web portion being along a plane and spaced apart from one another, each web portion having opposing protrusions extending towards one another and away from each of the planes of the webs.

10. A safety hook according to claim 8 wherein said locking element comprises a pair of wall portions, each wall portion being along a plane and spaced apart form one another at a distance that allows the wall portions to nest between said web portions of said gate and accept the shank of the body of said hook, each wall portion having a slot adapted for receiving the protrusions of the webs of the gate.

11. A safety hook according to claim 8 wherein the wall portion of the locking element is mounted next to the shank of said hook and the web portion of said gate is mounted over the wall portion of the locking element, so that the wall portion of the locking element is substantially concealed by the web portion of said gate.

12. A safety hook according to claim 8 wherein said gate is pivotally attached to the shank of said hook and said locking element is pivotally attached to the shank of said hook.

13. A safety hook according to claim 12 wherein said gate is pivotally attached to the shank of said hook and said locking element is pivotally attached to the shank of said hook.

* * * * *